United States Patent [19]

Lewis et al.

[11] 4,022,730

[45] May 10, 1977

[54] OLIGOMERIC AQUEOUS FINISHES

[75] Inventors: Sheldon N. Lewis, Willow Grove; David R. Gehman, Harleysville; Richard A. Haggard, Fort Washington, all of Pa.

[73] Assignee: Rohm and Haas Company, Philadelphia, Pa.

[22] Filed: Oct. 21, 1974

[21] Appl. No.: 516,061

Related U.S. Application Data

[63] Continuation-in-part of Ser. No. 467,353, May 6, 1974.

[52] U.S. Cl. .................. 260/28.5 R; 260/29.6 AT
[51] Int. Cl.$^2$ ....................................... C09G 1/10
[58] Field of Search ................. 106/3, 10, 271; 260/28.5, 29.6 AT

[56] References Cited

UNITED STATES PATENTS

| | | | |
|---|---|---|---|
| 2,744,884 | 5/1956 | de Benneville | 260/78.5 B |
| 3,328,325 | 6/1967 | Zdanowski | 260/28.5 R |
| 3,467,610 | 9/1969 | Fiarman et al. | 106/10 |
| 3,532,654 | 10/1970 | Finn et al. | 260/28.5 R |
| 3,553,123 | 1/1971 | Behnke | 106/8 |
| 3,637,559 | 1/1972 | Pinkney | 260/28.5 R |
| 3,647,732 | 3/1972 | Gower et al. | 260/28.5 R |

*Primary Examiner*—Theodore Morris
*Attorney, Agent, or Firm*—Harold L. Greenwald; Terence P. Strobaugh

[57] ABSTRACT

A method for leveling latex polishes which comprises treating said polishes with a salt of partially hydrolyzed polymer of methacrylic ester wherein said polymer has an average chain length of from about 6 to about 20 mer units.

27 Claims, No Drawings

OLIGOMERIC AQUEOUS FINISHES

This application is a continuation-in-part of U.S. application Ser. No. 467,353, filed May 6, 1974 now abandoned.

This invention relates to the use of low molecular weight salts of partially hydrolyzed polymers of methacrylic esters as leveling aids in latex polish finishes.

Leveling aids are employed in finish formulations to ensure a smooth finish to the polish and have their broadest utility in floor polishes. Two major considerations in selecting leveling aids are water white initial color and the ability to refrain from yellowing upon aging. At the present time, two types of leveling aids dominate the floor polish market. Rosin esters are used when gloss is considered to be more important than wear resistance and color. The styrene-maleic anhydride resins are selected when superior color and improved wear resistance are of prime importance. It has now been found that low molecular weight polymer compositions comprising an anionically polymerized addition homopolymer of an ester of methacrylic acid which after partial hydrolysis and conversion to a salt provide leveling aids which offer an increased balance of gloss/leveling, wear resistance and color over leveling aids presently available.

The tris-, tetra- and higher acids prepared by hydrolysis of the polymers of methacrylic esters have previously been described in U.S. Ser. No. 371,921, filed June 20, 1973 which application is hereby incorporated by reference.

We have found that salts of the tris-, tetra- and higher carboxy containing methacrylate polymers must fall within specific molecular weight ranges and acid number ranges to afford improved leveling aids. The acid number which is the number of milligrams of potassium hydroxide required to neutralize the acidic constituents in one gram of material is in the range of from about 90 to about 200 with a preferred acid number in the range of from about 120 to about 160. The weight average molecular weight ($M_w$) is in the range of from about 700 to about 2,000 with the preferred $M_w$ being in the range of from about 900 to about 1,200.

The polishing compositions of the present invention can generally be defined as follows:

| | Constituent | |
|---|---|---|
| (A) | Polymer Emulsion - parts by weight | 10–100 |
| (B) | Wax - Parts by weight | 0–90 |
| (C) | Leveling aid | 1–50 |
| (D) | Wetting, emulsifying, plasticizing and dispersing agents - percent | 1–50% |
| (E) | Polyvalent metal compound | 0–50 |
| (F) | Water to make total solids of | 5–50 |

The leveling aids are generally employed at the range of from 1–50% of the total formulation with the preferred range being in the range of from about 5 to about 20% of the total formulation.

Any of the known acrylic polish emulsions can be employed in this invention. For example, those disclosed in U.S. Pat. Nos. 3,467,610 and 3,328,325 which patents are hereby incorporated by reference. In addition, the wetting, plasticizing, emulsifying and dispersing agents are also well known in the art and are disclosed in U.S. Pat. No. 3,467,610. We have found that when preparing polish formulations using the leveling aids of this invention that the performance of the leveling aid is increased by employing from 1 to 50% and preferably from 10 to 25% of dispersing or wetting agent (solids on total solids) of the nonionic type such as ethylene oxide modified alkyl phenols, for example, tert-octyl phenol, modified by 1 to 40 ethylene oxide units, and preferably a tert-octyl phenol modified by 5 ethylene oxide units, ethylene oxide modified higher fatty alcohols, for example, lauryl alcohol containing 20 to 50 ethylene oxide units (similarly, modified long chain mercaptans, fatty acids, amines and the like can be employed).

The oligomers are prepared by the methods disclosed in Belgian Pat. No. 782,513 and U.S. Pat. Appln. Ser. No. 371,921 which patent and patent application are hereby incorporated by reference.

The polymers of the invention have the following structural formula:

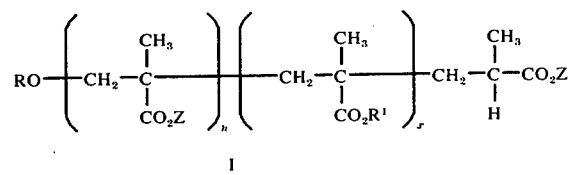

wherein RO is a residue of a chain regulating alcohol; $R^1O$ is the alcohol portion of the monomeric ester of methacrylic acid; n is an integer equal to or greater than 1, for example 2–4; x is an integer having a value in the range of from about 1 to about 45 and Z is a cation derived from an alkali metal such as sodium, potassium and the like, ammonia or a tertiary amine such as an alkanolamine including dimethylethanolamine, diethylethanolamine, triethanolamine, N-methylmorpholine and the like. Generally, at least about 85% by weight of the molecules of the homopolymer or copolymer in the polymer compositions have chain lengths falling between $\sqrt{2\bar{n}}$ and $2\bar{n}$, where $\bar{n}$ is the average chain length of the polymer. Thus, when the average chain length of the homopolymer or copolymer is about 6 mers, at least about 85% by weight of the molecules of the homopolymer or copolymer generally have chain lengths of about 3 to 12 mers, and when the average chain length of the homopolymer or copolymer is about 25 mers, at least about 85% by weight of the molecules of the homopolymer or copolymer generally have chain lengths of about 7 to about 50 mers. In a preferred embodiment of the invention, at least about 85% by weight of the molecules of the homopolymer or copolymer in the polymer compositions will have a chain length of about 4 to 40 mers. Depending upon the particular ester of methacrylic acid which is employed, and the particular comonomer which may be employed, the polymer compositions of the invention will have a molecular weight distribution (weight average molecular weight, Mw) in the range of about 400 to about 10,000, and preferably about 500 to about 2500. The dispersities (ratio of weight average molecular weight to number average molecular weight) of the polymer compositions of the invention are also quite low, generally being about 1.1 to about 3, preferably less than about 2, and most preferably less than about 1.5.

A preferred procedure for preparing the polymers (I, supra) is by a two-stage process. In the first stage of the reaction, the polymer having all ester functions and a low molecular weight distribution, is prepared by a batch or gradual addition technique using from about 20 to about 60% by weight of the total monomer charge and using a relatively high alcohol concentration generally in the range of from about 20 to about 50 mole percent of the initial monomer charge. The remainder of the monomer charge is then added to the reaction mixture. The addition of the remaining monomer is exothermic and leads to a revised molecular weight distribution. The reaction is generally conducted at a temperature in the range of from about 40° to about 130° C. and preferably at a temperature in the range of from about 60° to about 95° C. Although the polymerization can be conducted without a solvent, improved yields are obtained when a solvent is employed in the later stages of the polymerization. The solvents which may be employed include the aromatic solvents such as toluene, xylene and the like. Catalysts which may be employed include the alkoxides, for example, the alkali metal alkoxides, such as sodium alkoxide, potassium alkoxide and the like, including sodium methoxide, potassium methoxide, potassium tert-butoxide and the like, at a concentration in the range of from about 0.4 to about 4 mole percent and preferably from about 0.6 to about 3 mole percent based on the total monomer charge.

The tris-, tetra- and higher acids of these oligomers may be prepared by treating the oligomeric esters with a base such as an alkali metal base, including sodium hydroxide, potassium hydroxide and the like. The conversion of the oligomeric esters to the mono- and bis-carboxy polymers is relatively rapid and generally occurs within one hour at a temperature in the range of from about 70° to about 75° C. The tris-, tetra- and higher carboxy containing oligomers are obtained by further heating the basic reaction mixture at a temperature in the range of from about 80° to about 120° C. for a period of time from about 2 to about 5 hours. The alkali metal salts obtained are converted to the free acid by dissolving said salt in water in the presence of a water insoluble organic liquid, acidifying the aqueous solution and collecting the organic layer which will contain the desired acid. The alkali metal salts may be converted to other bases and employed as leveling agents. Examples of some other bases include those obtained from ammonia, tertiary amines such as alkanolamines including dimethylethanolamine, diethylethanolamine, triethanolamine, N-methylmorpholine and the like.

The following examples illustrate the preparation of various salts of the partially hydrolyzed methacrylate esters.

EXAMPLE 1

Partially hydrolyzed polymer of Methyl methacrylate and Ammonium Salt - Acid No. 152

Step A - Methyl methacrylate Polymer

To a three-necked, two liter flask equipped with a condenser, stirrer, thermometer and addition funnel is added, under nitrogen, toluene (30 g.), sodium methoxide in methanol (17.3 g., 25%), potassium methoxide in methanol (4.6 g., 30.5%) and methanol (12.6 g.). This mixture is heated to 60°–63° C. and then methyl methacrylate (300 g., 3.0 mole) is added. The temperature of the mobile, yellow reaction mixture is maintained at 60°–63° C. for 1½ hours. To this reaction mixture is then added methyl methacrylate (700 g., 7.0 mole) and toluene (210 g.) over about a 1 hour period maintaining the reaction temperature at 60°–63° C. by use of an ice bath. The temperature of the reaction mixture is maintained at 60°–63° C. for an additional 30 minutes after completion of monomer addition to insure greater than 99% conversion. The reaction product is used directly in the following step without further purification.

Step B - Partially hydrolyzed polymer of Methyl Methacrylate and Ammonium Salt Polymeric methyl methacrylate (654 g.) is added to a 3-liter flask equipped with a bottom stopcock, reflux condenser, stirrer and thermometer. The polymer is warmed to 50°–55° C. and to this is then added aqueous potassium hydroxide (100 g., 0.83 mole, 8.12 milliequivalents per gram, 18 equivalent percent). The pale yellow emulsified mixture is maintained at 40° C. with stirring for one hour and then at 60° C. at one hour and then at 77°–80° C. for two hours. The mixture becomes clear yellow at 75° C. (titration disclosed 74% conversion, by the ratio of strong base to weak base after the 60° C. hold and 96–97% at the end of a two hour hold at 77–80° C.). The solution is cooled to 70° C.; charged with additional potassium hydroxide (45%, 54.3 grams, 0.44 moles, 9.0 equivalent percent) and refluxed at 80°–83° C. for five hours. Toluene (127 g.) is added and the reaction mixture distilled over a 1½ hour period, removing about 150 grams of distillate to a head temperature of 83.5° C. To the remaining solution at 60°–65° C. is added toluene (169 g.) and phosphoric acid 32% (410 g., 1.35 mole, 102% of base charge) over a 12–15 minute period. The white mobile two phase mixture is stirred for an additional ten minutes and the stirring is stopped. The lower layer is removed and discarded. To the remaining layer is added water (220 g.) and a vacuum of 225 mm is applied. The stirred mixture is subjected to azeotropic toluene removal at 50°–55° C. during 1¼ hours as the pressure and pot temperatures are increased. The water is returned to the pot. A total of 275 grams of azeotropic distillate is removed. The final pot temperature is 102°–103° C. and the final pressure is one atmosphere. The remainder is cooled and ammonia (29%, 63 g., 1.08 mole) is added dropwise over a 25 minute period. The pale yellow, bubbly solution is stirred for an additional 15 minutes. The product at 60° C. was retained and has the following characteristics: Solids content - (100°/90'): 59.9%; Acid content - 1.63 meg/g., on solution (ca. 2.7 meg./g., on solids; A.N. 152); Appearance - clear, bright yellow viscous oil at room temperature and pH (10% solution): 8.2–8.3. The carboxy content of this product is about 2.6.

EXAMPLE 2

Partially hydrolyzed polymer of Methyl Methacrylate and ammonium salt - Acid No. 194

Using apparatus and the neutral methyl methacrylate oligomer described in Example 1, there is charged to the reaction vessel 1,000 grams of a 79.5 wt. % solution in toluene (795 g. oligomeric methyl methacrylate, $M_w$ about 1050, containing 7.70 gram equivalents of ester functionality). The oil is warmed to 60° C. with agitation and charged with 243 g. (3.08 mole, 40 eq. % on total ester) of 50–51 wt. % aqueous sodium hydroxide. The emulsified yellow mixture is heated to 70°–75° C. and maintained until an exotherm set in 30–45 minutes after attaining 70° C. The mild exotherm is held below 83°–85° C. with air cooling. After the exotherm subsides (5–10 minutes), the thickened yellow reaction mixture is refluxed (84°–87°) for 3 hours. Titration discloses 50–55% conversion after the exotherm and 78–82% conversion after the succeeding 3 hour period. The batch is cooled to 75° C., diluted with 250 g. water and stripped at one atmosphere pressure during two hours, removing 275–290 g. of distillate and terminating at a head temperature of 84° C. Reaction is continued at reflux for an additional 1½ hours. Titration discloses the desired 90% conversion (36 of 40 eq. % base consumed). The mix is charged with 550 g. water, 100 g. isobutanol (tech. grade) and 250 g. toluene and held at 55°–60° C. Via dip tube is added 234 g. (2.31 mole, 75 mole %) of 97% $H_2SO_4$ over a 20 minute period. Cooling is required to control the acid dilution exotherm temperature below 60° C. (Care is exercised in providing adequate stirring, however, vigorous agitation is avoided since it results in partial emulsification and subsequent slow separation.) The batch becomes a white mobile two-phase mixture and is agitated for an additional 15 minutes. Stirring is stopped; the phases separate and the lower layer is drained through the bottom stopcock to afford about 1020 g. of aqueous salt layer, leaving a pale, gray-white toluene/isobutanol product mixture. To the crude product mixture, 450 g. of water is charged and the pot temperature raised to 60°–65° C. at reduced pressure to obtain reflux. Most of the toluene and isobutanol is removed by reverse azeotrope (returning water to the pot). After approximately 70% of the solvent is removed and the reaction mixture has begun to thicken, the pot is vented to one atmosphere. Solvent removal continues until the head temperature reaches 98°–99° C. and the distillate weight is 115–150 g. At this time, additional distillate (primarily water) is removed until the distillate weight is 120–130 g. Final atmospheric distillation conditions are 100°–101° C. in the pot and 100° C. at the head. The hot product is a white, two phase, soft gum. The mixture is cooled to 85° C. and treated, dropwise (preferably by belowsurface addition) with 189 g. (3.18 mole, about 103% of theory) of 28% ammonia. One-half of the aqueous ammonia is added with slight cooling over 10 minutes at which point solubilization and some thinning occurs. The solution is cooled to 60°–65° C. and the remaining ammonia charged during 10 minutes. The pale yellow, bubbly solution is stirred for an additional 15 minutes and then bottled. The product, a clear, light yellow solution of mild ammoniacal odor, results in the following analysis: Solids content (100° C/90 min. for 1 g. sample), 58–60%; carboxylate content, 2.07 meq./g.; acid number, 194; pH, 9.2; viscosity about 70,000 cps/25° C.; viscosity at 50–52%, 8,000 cps.

EXAMPLE 3

Partially Hydrolyzed Polymer of Methyl Methacrylate - Acid No. 138

To a polymer of methyl methacrylate (335 g., 79.4% solid) prepared according to Example 1, Step A, in a three liter, three necked flask equipped with bottom stopcock, reflux condenser, stirrer and thermometer, under a nitrogen atmosphere, at 60° C. is added aqueous sodium hydroxide (55.7 g., 0.7 mole, 50.8%). The emulsified yellow mixture is heated to 72°–74° C. Within 30 minutes, a slow exotherm begins and is allowed to continue with the maximum temperature reaching 82° C. After the exotherm subsides (about 5 minutes) the reaction mixture is heated to reflux (83° C.) for 1¼ hour. Titration discloses about 90% conversion. Additional refluxing for one hour affords 95% conversion. To the yellow-orange oil is added water (137 g.) and toluene (100 g.) and the temperature maintained between 50°–60° C. Sulfuric acid (55.4 g., 0.55 mole, 150 eq.%) is then added over a 15 minute period with cooling to maintain the temperature at or below 60° C. The reaction mixture becomes a white, mobile, two phase mixture and is stirred for an additional 10 minutes. After the stirrer is stopped, the phases separate and, after 20 minutes, the lower layer is removed. To the remaining toluene layer containing the product is added isobutanol (14 g.) and toluene (56 g.) The solvent is removed under reduced pressure to afford a dry toluene/isobutanol solution at 68% solids. The product has an acid number of 138 and a viscosity of about 75,000 cps.

EXAMPLE 4

Partially Hydrolyzed Polymer of Methyl Methacrylate - Acid No. 138

Polymeric methyl methacrylate (1,000 g., 79.4% solid) prepared according to Example 1, Step A, is added to a three liter, three necked flask equipped with bottom stopcock, reflux condenser, stirrer and thermometer. The polymer is heated to 60° C. at which time aqueous sodium hydroxide (167 g., 50.8%, 2.12 mole) is added. Within 20 minutes, the reaction mixture exotherms and the temperature is allowed to reach 82° C. After the exotherm subsides, the reaction mixture is heated to reflux (84° C.) for 1½ hours. The reaction mixture is cooled to 30° C., diluted with water (250 g.) and stripped at one atmosphere over 1¼ hours to remove 271 g. of distillate. To the residue is added water (411 g.) and toluene (300 g.) and warmed to 50°–60° C. Sulfuric acid (166 g., 97%) is added over a 15 minute period with cooling to maintain the temperature below 60° C. The reaction mixture becomes a white, mobile, two phase mixture. Stirring is continued for an additional 10 minutes. After the stirring is stopped, the phases separate and after 10 minutes the lower layer is removed. To the remaining toluene solution is added water (600 g.) and the mixture heated to reflux to azeotropically remove the toluene. After the distillation, the reaction mixture is cooled to 85° C. and treated dropwise with aqueous ammonia (135 g., 2.26 mole, 28%). After 2/3 of the ammonia is added solubilization occurs. The solution is cooled to 60°–65° C. and the remaining ammonia is added over a 7 minute period. After 15 minutes of additional stirring, the reaction mixture is diluted with an additional 65 g. of water to afford a clear, light yellow solution having the following characteristics: solid content, 51% carboxylate, 1.26 meq./g.; acid number, 138; pH, 9.2 and viscosity at 25° C., 34,000 cps.

EXAMPLE 5

| Formulation | |
|---|---|
| 1. Emulsion - 21.5 MMA/3.5 MAA/25 BA/30 St/20 AN (15% Solids) | 72.5 |
| 2. Leveling Agent (15% solids) | 16.5 |
| 3. Wax Emulsion (Epolene E10, 15% solids) | 11.0 |
| 4. Diethyleneglycol monomethyl ether | 1.0 |
| 5. Ethylene glycol | 1.0 |

EXAMPLE 5-continued

| Formulation | |
|---|---|
| 6. Tributoxyethyl phosphate | 0.4 |
| 7. Surfactant (1%) | 0.4 |
| Adjust pH to 9.0 with 28% NH$_4$OH | |

Components 1, 2 and 3 are mixed and stirred for 15 minutes. Components 4, 5, 6 and 7 are then added and the mixture adjusted to pH 9.0 with ammonium hydroxide (28%). The polish is allowed to stand overnight before testing.

By employing various leveling agents of this invention in the above and following formulations, there are prepared various floor polish finishes superior to floor polishes prepared with the same formulation using known leveling agents. The following Tables I, II, III and IV give the results obtained on tests of various floor finishes.

The test show that polishes containing a salt or salts of the partially hydrolyzed methacrylate oligomers as leveling aids combine the best features of the commercial classes of prior art resins including the gloss and leveling of the rosin type with the durability (wear resistance) of the SMA type resin, all with better color than either class of product. The following abbreviations are used in this and the succeeding examples: MMA - methyl methacrylate, MAA - methacrylic acid, BA - butyl acrylate, St - styrene, AN - acrylonitrile, and SMA - styrene-maleic anhydride.

TABLE I

| Leveling Agent | None | Control[1] | Control[2] | Partially hydrolyzed MMA Oligomers | | | | | | | |
|---|---|---|---|---|---|---|---|---|---|---|---|
| Approx. Average M.W. | — | 700 | 1900 | 700 | 700 | 1050 | 1050 | 1600 | 1600 | 2000 | |
| Approx. Acid No. | — | 180 | 220 | 190 | 260 | 150 | 200 | 100 | 130 | 90 | |
| Polish Color[3] | 1 | 3 | 2 | 1 | 1 | 1 | 1 | 1 | 1 | 1 | |
| Leveling | Poor | VG | Fair | Fair- | Fair- | Exc. | Good | VG | VG | VG | |
| Gloss | Good | VG | Good | Good | Good | VG | VG | VG | VG- | Good | |
| Recoatability | — | Good | Good- | Good | Good- | VG | Exc. | Good | VG | VG | |
| Wear Resistance | — | Good- | VG | Fair | Fair | Good- | VG | Good | VG | VG | |

[1]A commercially available rosin/maleic anhydride adduct condensed with polyols, supplied by Shanco Plastics, Tonawanda, New York
[2]A partially esterified styrene/maleic anhydride resin supplied by Arco Chemical Co.
[3]Polish Color rated as follows: 1=nil color; 2=yellow; 3=light tan and 4=brown

EXAMPLE 6

Formulation for a zinc crosslinked, detergent resistant floor polish

| | | |
|---|---|---|
| 1. 28BA/52MMA/12St/8MAA[2] (15% solids) | 75 | |
| 2. Leveling Agent (15% solids) | 10 | |
| 3. Wax Emulsion (15% solids)[1] | 15 | |
| 4. Diethylene glycol monomethyl ether | 4 | |
| 5. Tributoxyethyl phosphate | 1 | |
| 6. Surfactant (1%) | 0.6 | |

EXAMPLE 6-continued

Formulation for a zinc crosslinked, detergent resistant floor polish

| | |
|---|---|
| 7. Defoaming Agent | 0.0125 |

[1]An unoxidized emulsion of low density polyethylene supplied by Cosden Oil and Chemical Co.
[2]An emulsion containing 2% zinc as Zn(NH$_3$)$_4$(HCO$_3$)$_2$ on solids.

TABLE II

| Leveling Agent | Control[1] | Control[2] | Partially Hydrolyzed MMA Oligomers | | | |
|---|---|---|---|---|---|---|
| Approx. M. W. | 700 | 1900 | 1050 | 1050 | 1600 | 2000 |
| Approx. Acid No. | 200 | 220 | 150 | 200 | 130 | 90 |
| Polish Color[3] | 3 | 2 | 1 | 1 | 1 | 1 |
| Leveling | Exc.- | Fair | Exc. | Exc. | Good | Good |
| Recoatability | Exc. | Good | Exc. | VG | Exc. | Exc. |
| Detergent Resistance | Exc. | VG | Exc. | VG | Exc. | Exc. |
| Wear Resistance | Exc. | Exc. | Exc. | Exc. | Exc. | Exc. |

[1]A commercially available rosin/maleic anhydride adduct condensed with polyols, supplied by Hooker Chemical Co., Tonawanda, New York
[2]A partially esterified styrene/maleic anhydride resin supplied by Arco Chemical Co.
[3]Polish Color Code: 1=nil; 2=yellow; 3=tan and 4=brown

EXAMPLE 7

Formulation based on a zinc-crosslinked, detergent resistant polymer

| | | |
|---|---|---|
| 1. Ubatol DW 855 (15% solids)[1] | 75 | |
| 2. Leveling Agent (15% solids) | 10 | |
| 3. Wax Emulsion (15% solids)[2] | 15 | |
| 4. Diethyleneglycol monomethyl ether | 1.5 | |
| 5. Ethylene glycol | 1.5 | |
| 6. Tributoxyethyl phosphate[1] | 0.8 | |
| 7. 2-Pyrrolidone | 0.4 | |
| 8. Surfactant (1%) | 0.6 | |

[1]Ubatol DW 855 is a zinc crosslinked, detergent resistant floor polish polymer emulsion supplied by Staley Chemical Co., Kearney, N.J.
[2]An emulsion of lower molecular weight polyethylene supplied by Allied Chemical Co., Morristown, N.J.

TABLE III

| Leveling Agent | Control[1] | Partially Hydrolyzed MMA Oligomer | | | |
|---|---|---|---|---|---|
| Approx. M. W. | 700 | 1050 | 1050 | 1600 | 2000 |
| Approx. Acid No. | 200 | 150 | 200 | 130 | 90 |
| Polish Color[2] | 3 | 1 | 1 | 1 | 1 |
| Leveling | VG | Exc. | VG- | VG | VG |
| Recoatability | Exc. | Exc. | VG | Exc. | Exc. |
| Detergent Resistance | Exc. | Exc. | VG | Exc. | Exc. |
| Wear Properties | VG | VG | VG | VG | VG |

[1]A commercially available rosin/maleic anhydride adduct condensed with polyols, supplied by Hooker Chemical Co., Tonawanda, N.Y.
[2]Polish Color: 1=nil color; 2=yellow; 3=tan and 4=brown

EXAMPLE 8

Formulation based on a zinc crosslinked, detergent resistant polymer

| | | |
|---|---|---|
| 1. Polymer Emulsion (15% solids)[1] | 72 | |
| 2. Leveling Agent (15% solids) | 10 | |
| 3. Wax Emulsion A (15% solids)[2] | 10 | |

EXAMPLE 8-continued

Formulation based on a zinc crosslinked, detergent resistant polymer

| | | |
|---|---|---|
| 4. | Wax Emulsion B (15% solids)[2] | 8 |
| 5. | Ethyleneglycol monoethyl ether | 1.5 |
| 6. | Ethylene glycol | 1.5 |
| 7. | Tributoxyethyl phosphate | 0.5 |
| 8. | Dibutyl phthalate | 0.3 |
| 9. | Surfactant (1%)[3] | 0.5 |

[1]A zinc crosslinked detergent resistant floor polish polymer emulsion supplied by Morton Chemical Co.
[2]Wax Emulsion A and Wax Emulsion B are emulsions of low molecular weight polyethylene supplied by Allied Chemical Co., Morristown, N.J.

TABLE IV

| Leveling Agent | Control[1] | Partially Hydrolyzed MMA Oligomer | | | |
|---|---|---|---|---|---|
| Approx. M. W. | 1900 | 1050 | 1050 | 1600 | 2000 |
| Approx. Acid No. | 220 | 150 | 200 | 130 | 90 |
| Color | 2 | 1 | 1 | 1 | 1 |
| Leveling | Good | VG- | VG | VG | VG |
| Recoatability | VG | VG | VG | VG | VG |
| Detergent Resistance | Exc. | Exc. | VG | Exc. | Exc. |
| Wear Resistance | VG | VG | VG | VG | VG |

[1]A partially esterified styrene/maleic anhydride resin supplied by Arco Chemical Co.

What is claimed is:

1. A method for formulating an aqueous polish composition which contains a polymer emulsion and, as a leveling aid, a salt of a polymer comprising mer units of methacrylic acid and at least one ester of methacrylic acid, having an average carboxy content of at least about 2.6 and an average chain length, $\bar{n}$, of from about 6 to about 20 mer units per molecule.

2. The method of claim 1 wherein the leveling aid polymer is an alkoxide-polymerized polymer wherein at least about 85% by weight of the molecules have chain lengths of about $\sqrt{2\bar{n}}$ to about $2\bar{n}$ mers.

3. The method of claim 2 wherein the leveling aid polymer is a partially hydrolyzed polymer of at least one ester of methacrylic acid.

4. The method of claim 3 wherein the leveling aid has the following structural formula:

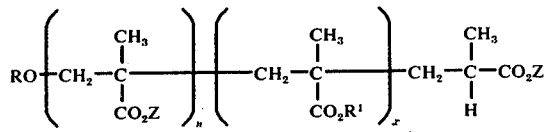

wherein RO is a residue of a chain-regulating alcohol; R$^1$O is the alcohol portion of the monomeric ester of methacrylic acid; $n$ is an integer equal to or greater than 1; $x$ is an integer having a value in the range of from about 1 to about 45, and Z is a cation derived from an alkali metal, ammonia or a tertiary amine.

5. The method of claim 4 wherein the leveling aid polymer has an acid number in the range of from about 90 to about 200 and has a weight average molecular weight ($\bar{M}_w$) in the range of from about 700 to about 2,000.

6. The method of claim 5 wherein the acid number is in the range of from about 120 to about 160 and the weight average molecular weight ($\bar{M}_w$) is in the range of from about 900 to about 1,200.

7. The method of claim 6 wherein the leveling aid comprises from about 1 to about 50% of the total polish formulation.

8. The method of claim 6 wherein the leveling aid comprises from about 5 to about 20% of the total polish formulation.

9. An aqueous composition for floor polishing which comprises from about 10 to about 100 parts by weight of a polymer emulsion; from about 0 to about 90 parts by weight of a wax; from about 1 to about 50 percent by weight solids on total solids of wetting, emulsifying, plasticizing and dispersing agents; from about 0 to about 50 parts by weight of a polyvalent metal compound and from about 1 to about 50 parts by weight of a leveling agent wherein the improvement comprises the leveling agent being a salt of a partially hydrolyzed polymer of methacrylic ester having a carboxy content of at least about 2.6 and an average chain length of from about 6 to about 20 mer units.

10. The composition of claim 9 wherein the leveling aid polymer is an alkoxide-polymerized polymer wherein at least about 85% by weight of the molecules have chain lengths of about $\sqrt{2\bar{n}}$ to about $2\bar{n}$ mers.

11. The composition of claim 10 wherein the leveling aid polymer is a partially hydrolyzed polymer of at least one ester of methacrylic acid.

12. The composition of claim 9 wherein the wetting agent is nonionic, comprising multiple ethylene oxide units.

13. The composition of claim 11 wherein the leveling aid comprises from about 5 to about 205 of the total polish formulation.

14. An aqueous composition according to claim 13 wherein the acid number of the leveling aid polymer is in the range of from about 120 to about 160 and the weight average molecular weight is in the range of from about 900 to about 1200.

15. The composition of claim 14 wherein the wetting agent is from 10 to 25% of a tert-octylphenol modified by 5 ethylene oxide units.

16. An aqeuous composition according to claim 14 wherein the wetting agent is nonionic selected from ethylene oxide modified alkyl phenols or ethylene oxide modified higher fatty alcohols.

17. The aqueous composition according to claim 16 wherein the wetting agent is a tert-octylphenol modified by from about 1 to about 40 ethylene oxide units.

18. An aqueous polish composition which contains a polymer emulsion and, as a leveling aid, a salt of a polymer comprising mer units of methacrylic acid and at least one ester of methacrylic acid, having an average carboxy content of at least about 2.6 and an average chain length, $\bar{n}$, of from about 6 to about 20 mer units per molecule.

19. A composition comprised of the polymer of claim 18 with from 1 to 50% of a wetting agent of the nonionic type selected from an ethylene oxide modified alkylphenol, and ethylene oxide modified fatty alcohol, an ethylene oxide modified long chain mercaptan, an ethylene oxide modified fatty acid or an ethylene oxide modified amine.

20. The composition of claim 18 wherein the wetting agent is from 10 to 25% of a tert-octylphenol modified by 5 ethylene oxide units.

21. The composition of claim 20 wherein the leveling aid polymer is an alkoxide-polymerized polymer wherein at least about 85% by weight of the molecules have chain lengths of about $\sqrt{2\bar{n}}$ to about $2\bar{n}$ mers.

22. The composition of claim 21 wherein the leveling aid polymer is a partially hydrolyzed polymer of at least one ester of methacrylic acid.

23. The composition of claim 22 wherein the leveling aid has the following structural formula:

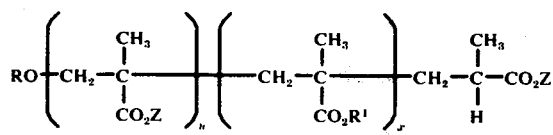

wherein RO is a residue of a chain-regulating alcohol; R¹O is the alcohol portion of the monomeric ester of methacrylic acid; $n$ is an integer equal to or greater than 1; $x$ is an integer having a value in the range of from about 1 to about 45, and Z is a cation derived from an alkali metal, ammonia or a tertiary amine.

24. The composition of claim 23 wherein the leveling aid has an acid number in the range of from about 90 to about 200 and a weight average molecular weight in the range of from about 700 to about 2,000.

25. The composition of claim 24 wherein the acid number is in the range of from about 120 to about 160 and the weight average molecular weight is in the range of from about 900 to about 1,200.

26. The composition of claim 24 wherein the leveling aid comprises from about 1 to about 50% of the total polish formulation.

27. The composition of claim 26 wherein the leveling aid comprises from about 5 to about 20% of the total polish formulation.

* * * * *

UNITED STATES PATENT AND TRADEMARK OFFICE
CERTIFICATE OF CORRECTION

PATENT NO. : 4,022,730
DATED : May 10, 1977
INVENTOR(S) : Sheldon N. Lewis, David R. Gehman, Richard A. Haggard It is certified that error appears in the above-identified patent and that said Letters Patent are hereby corrected as shown below:

Column 1, line 28, insert --about 2.5-- after the word "The"; line 33, insert --about 2.5-- after the word "the"; lines 42 and 43, delete "$M_w$" and insert --$\overline{M}_w$--. Column 2, line 58, delete "$M_w$" and insert --$\overline{M}_w$--. Column 4, lines 49 and 50, delete "meg/g." and insert --meq/g.--; line 62, delete "$M_w$" and insert --$\overline{M}_w$--. Column 8, EXAMPLE 7, #1, delete "Ubatol" and insert --Ubatol®--.

In the claims: In claim 13, delete "205" and insert --20%--.

In claim 20, delete "18" and insert --19--.

In claim 21, delete "20" and insert --18--.

In claim 26, delete "24" and insert --23--.

Signed and Sealed this

Twenty-first Day of March 1978

[SEAL]

Attest:

RUTH C. MASON
Attesting Officer

LUTRELLE F. PARKER
Acting Commissioner of Patents and Trademarks